US009255418B2

(12) United States Patent
Dimmer et al.

(10) Patent No.: US 9,255,418 B2
(45) Date of Patent: Feb. 9, 2016

(54) RETRACTABLE CURTAIN SYSTEM

(71) Applicant: Rush Company, Inc., Springfield, SD (US)

(72) Inventors: Jerry Dimmer, Yankton, SD (US); Troy Knouse, Yankton, SD (US)

(73) Assignee: RUSH COMPANY, INC., Springfield, SD (US)

( * ) Notice: Subject to any disclaimer, the term of this patent is extended or adjusted under 35 U.S.C. 154(b) by 0 days.

(21) Appl. No.: 14/282,350

(22) Filed: May 20, 2014

(65) Prior Publication Data

US 2014/0338277 A1    Nov. 20, 2014

Related U.S. Application Data

(60) Provisional application No. 61/825,276, filed on May 20, 2013.

(51) Int. Cl.
| *E04H 5/08* | (2006.01) |
| *E06B 9/64* | (2006.01) |
| *A01G 9/22* | (2006.01) |
| *A01K 1/00* | (2006.01) |
| *F24F 7/00* | (2006.01) |
| *F24F 11/00* | (2006.01) |

(52) U.S. Cl.
CPC  *E04H 5/08* (2013.01); *A01G 9/227* (2013.01); *A01K 1/007* (2013.01); *E06B 9/64* (2013.01); *F24F 2007/004* (2013.01); *F24F 2011/0002* (2013.01)

(58) Field of Classification Search
CPC .......... E04H 5/08; A01K 1/007; A01K 31/00; A01K 1/0064; A01K 1/00; F24F 2011/0002; F24F 2007/004; F24F 11/0001; F24F 13/10; E06B 9/64; E06B 9/40; A01G 9/227; A01G 9/14; A01G 9/24; A01G 9/241; A01G 9/242
USPC ............... 52/29, 63, 64, 67, 69, 302.1, 302.2, 52/302.3, 302.5; 160/121.1, 122, 242, 160/243; 135/93, 908; 454/239, 241, 252, 454/333, 256, 274
See application file for complete search history.

(56) References Cited

U.S. PATENT DOCUMENTS

| 3,211,211 | A | * | 10/1965 | Youngs | 160/243 |
| 3,306,344 | A | * | 2/1967 | Youngs | 160/241 |
| 3,398,779 | A | * | 8/1968 | Kuss | 160/243 |
| 3,464,480 | A | * | 9/1969 | Kuss | 160/368.1 |
| 3,474,761 | A | * | 10/1969 | Thomason | 119/448 |
| 3,915,377 | A | * | 10/1975 | Sutton, Jr. | 236/49.1 |
| 4,347,886 | A | * | 9/1982 | von Knorring | 160/242 |
| 4,494,707 | A | * | 1/1985 | Niibori | A01G 9/227 160/265 |
| 4,601,320 | A | * | 7/1986 | Taylor | 160/271 |
| 5,031,574 | A | * | 7/1991 | McDowell | 119/448 |
| 5,038,517 | A | * | 8/1991 | Talbott | A01G 9/242 47/17 |
| 5,212,903 | A | * | 5/1993 | Talbott | A01G 9/242 239/242 |

(Continued)

*Primary Examiner* — Joshua J Michener
*Assistant Examiner* — Matthew Gitlin
(74) *Attorney, Agent, or Firm* — Moss & Barnett

(57) ABSTRACT

A retractable curtain system including a first curtain region, a motor assembly and a mounting arm assembly. The first curtain region is capable of substantially covering the at least one opening when in an unrolled configuration. The motor assembly operably is attached to the first curtain region for moving the first curtain region between the unrolled configuration and a rolled configuration. The mounting arm assembly includes at least one mounting arm for pivotally mounting the motor assembly with respect to the building.

5 Claims, 5 Drawing Sheets

(56) References Cited

U.S. PATENT DOCUMENTS

| | | | | |
|---|---|---|---|---|
| 5,524,693 | A * | 6/1996 | Hamilton | 160/243 |
| 5,846,127 | A * | 12/1998 | Kile | 454/195 |
| 6,401,794 | B1 * | 6/2002 | Hamilton | 160/243 |
| 6,612,359 | B1 * | 9/2003 | Moreau | 160/120 |
| 6,860,310 | B2 * | 3/2005 | Kubly et al. | 160/122 |
| 7,152,653 | B1 * | 12/2006 | Kubly et al. | 160/120 |
| 7,624,783 | B2 * | 12/2009 | Sensenig | 160/23.1 |
| 8,905,830 | B2 * | 12/2014 | Schmelzer | 454/337 |
| 2005/0241779 | A1 * | 11/2005 | Abouloukme | 160/122 |
| 2011/0155330 | A1 * | 6/2011 | Schmelzer | 160/133 |
| 2014/0230346 | A1 * | 8/2014 | Blumberg et al. | 52/143 |
| 2014/0248831 | A1 * | 9/2014 | Kim et al. | 454/239 |

* cited by examiner

RETRACTABLE CURTAIN SYSTEM

REFERENCE TO RELATED APPLICATION

This application claims priority to U.S. Provisional Application No. 61/825,276, which was filed on May 20, 2013, the contents of each of which are incorporated herein by reference.

FIELD OF THE INVENTION

The invention relates generally to retractable curtain systems for buildings. More particularly, the invention relates to retractable curtain systems for agricultural buildings.

BACKGROUND OF THE INVENTION

In modern agricultural operations such as used in conjunction with livestock, it is typically desirable for the livestock to be housed in a building for at least a portion of the time because the building shields the livestock from weather such as cold temperatures, sun and rain.

These agricultural buildings are typically fabricated with a roof that extends over and substantially covers the agricultural building. Curtain systems are typically placed on the sides of the agricultural buildings. These curtain systems are movable between a closed configuration and an open configuration.

The curtain systems thereby enable ventilation in the agricultural buildings to be controlled. During warm weather, the curtain systems may be positioned in the open configuration so that there is free flow of air into the building. During cold weather, the curtain systems may be positioned in the closed configuration to limit air flow into the agricultural buildings.

As livestock herds grow larger, the size of the agricultural buildings must increase. In view of the length of the side walls and the height of the side walls, there have been challenges in developing a curtain system that is easy to install and operates in a highly reliable manner.

SUMMARY OF THE INVENTION

An embodiment of the invention is directed to a curtain system for use in conjunction with open side walls on a building. The curtain system can be moved between an open configuration and a closed configuration to change air flow through the building.

Another embodiment of the invention is directed to a retractable curtain system that includes a first curtain region, a motor assembly and a mounting arm assembly. The first curtain region is capable of substantially covering the at least one opening when in an unrolled configuration. The motor assembly is operably attached to the first curtain region for moving the first curtain region between the unrolled configuration and a rolled configuration. The mounting arm assembly includes at least one mounting arm for pivotally mounting the motor assembly with respect to the building.

Another embodiment of the invention is directed to a building ventilation system that includes a building and a retractable curtain system. The building has at least one opening in a side thereof. The retractable curtain system includes a first curtain region, a motor assembly and a mounting arm assembly. The first curtain region is capable of substantially covering the at least one opening when in an unrolled configuration. The motor assembly is operably attached to the first curtain region for moving the first curtain region between the unrolled configuration and a rolled configuration. The mounting arm assembly includes at least one mounting arm for pivotally mounting the motor assembly with respect to the building.

Another embodiment of the invention is directed to a method of operating a retractable curtain system with respect to a building having at least one opening in a side thereof. A motor assembly is pivotally mounted with respect to a building with a mounting arm assembly. The mounting arm assembly includes at least one mounting arm. A first curtain region is attached to the motor assembly. The first curtain region is positioned in an unrolled configuration where the first curtain region at least partially covers an opening in the building. The motor assembly is operated to cause the first curtain region to move from the unrolled configuration to a rolled configuration. The mounting arm assembly allows the motor assembly to pivot with respect to the building as the first curtain region moves from the unrolled configuration to the rolled configuration.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

Figure 1:
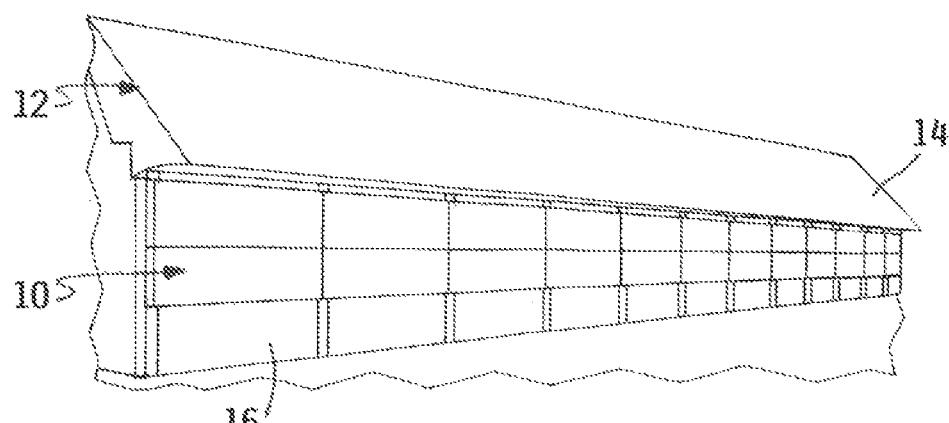
FIG. 1 is a perspective view of a curtain system according to an embodiment of the invention in a closed configuration.
Figure 2:
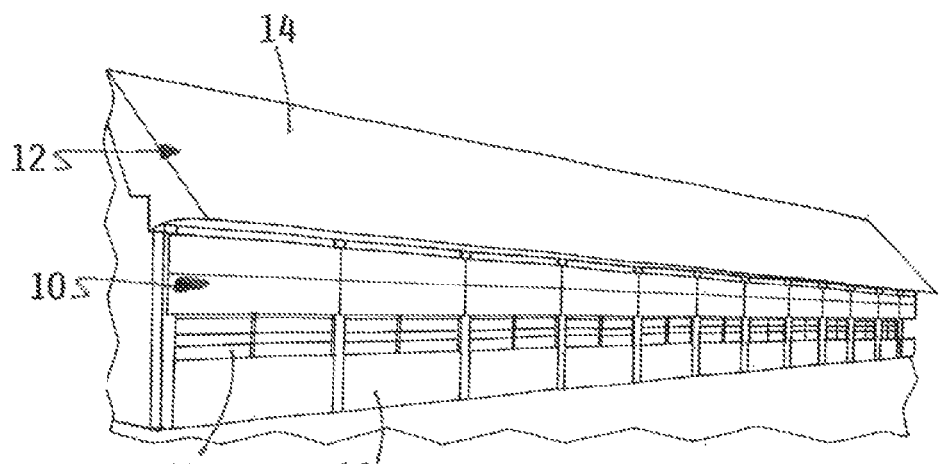
FIG. 2 is a perspective view of the curtain system of FIG. 1 in a partially open configuration.
Figure 3:
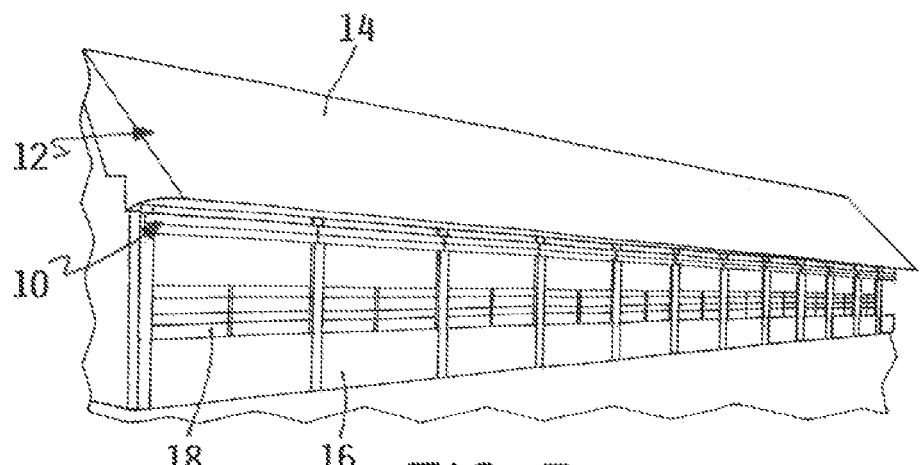
FIG. 3 is a perspective view of the curtain system of FIG. 1 in an open configuration.

An embodiment of the invention is directed to a curtain system 10 that is adapted for use in conjunction with a building 12, as illustrated in FIGS. 1-3. The curtain system 10 is movable between a closed configuration (FIG. 1) and an open configuration (FIG. 3) to control air flow in the building 12.

As referenced above, the buildings 12 can have a relatively large size when used in conjunction with a modern agricultural facility. In certain configurations, the buildings 12 may have a length of greater than several hundred feet.

The building 12 has a roof 14 that substantially covers the building 12. Sides 16 of the building 12 may have a plurality of openings 18 formed therein. These openings 18 are utilized to provide air movement through the building 12.

In certain embodiments, the openings 18 are each formed with a similar, generally rectangular shape and are positioned in a side-to-side configuration between opposite ends of the building 12. A person of skill in the art will appreciate that the building 12 may be fabricated from a variety of materials using the concepts of the invention.

Figure 4:
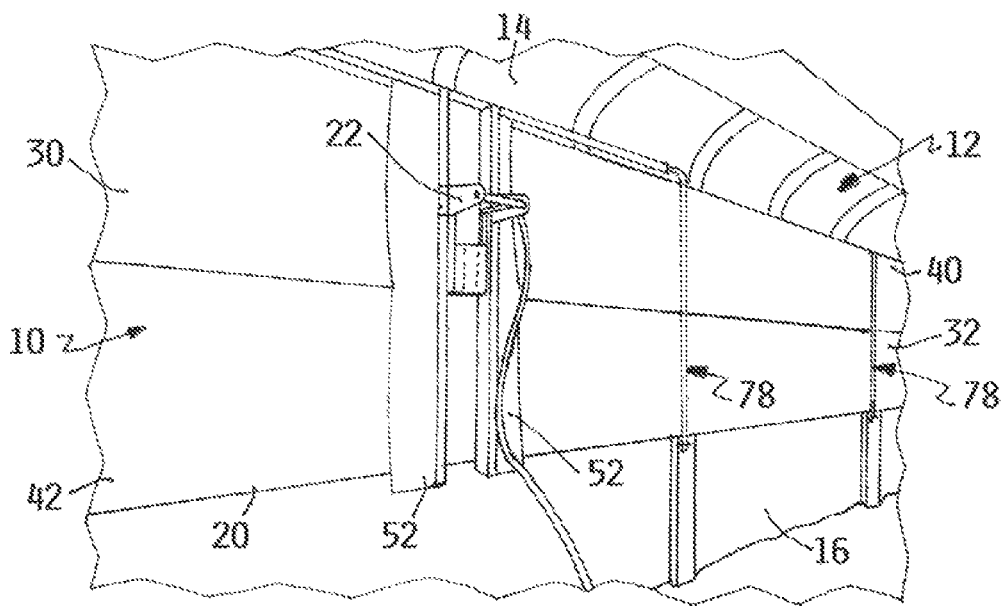
FIG. 4 is an enlarged perspective of an outer surface of a central region of the curtain system of FIG. 1.

The curtain system 10 generally includes a curtain region 20 and a motor assembly 22, as illustrated in FIG. 4. The motor assembly 22 is used to move the curtain region 20 between the closed configuration and the open configuration. In certain embodiments, the curtain region 20 includes a first curtain section 30 and a second curtain section 32 that are positioned on opposite sides of the motor assembly 22, as illustrated in the figures.

An upper edge of the curtain region 20 may be mounted to the side of the building 12 proximate an upper side of the openings 18. A variety of techniques may be used for mounting the upper edge of the curtain region 20 to the building 12.

An example of one suitable technique is forming an upper loop 40 in the curtain region 20 proximate the upper edge thereof and then inserting a upper tube 44 through the upper loop 40 so that the upper tube 44 is in a generally horizontal orientation. A bracket and fastener is then utilized to attach the upper tube 44 to the building 12, as is discussed in more detail herein.

A lower loop 42 may be formed in the curtain region proximate a lower edge thereof. A lower tube 46 may be extended through the lower loop 42 so that the lower tube 46 is in a generally horizontal orientation. Such a configuration enhances the rigidity of the lower edge of the curtain region 20 to thereby reduce the ability of the lower edge of the curtain region 20 to move such as in response to the force exerted by wind thereon.

Proximate an intermediate location of the curtain region 20, an intermediate tube 50 is attached hereto. Rotation of the intermediate tube 50 causes the curtain region 20 to be wound around the intermediate tube 50 to move the curtain region from the closed configuration to the open configuration.

The motor assembly 22 generally includes a motor 60, a transmission mechanism 64, and a mounting assembly 62. In certain embodiments, the motor 60 is an electric motor that is selected with a size that is sufficiently large to facilitate moving the curtain region 20 between the open configuration and the closed configuration. It can be appreciated that factors in selecting the motor include the height and width of the curtain region 20 as well as the weight of the curtain region 20.

Generally the motor 60 and the transmission assembly 64 are directly attached to the intermediate tube 50. A first example would consist of a gear reducer and sprocket assembly and a second example is a gear reducer only.

The mounting assembly 62 operably attaches the motor 60 to the building 12. Because of the force exerted by the motor 60 used in conjunction with a large curtain region 20, the mounting assembly 62 should be sufficiently strong to resist deformation.

The drive frame assembly includes two elongated support members 70 that are mounted in a vertical orientation to extend between the floor of the building 12 and the roof of the building 12 to support the drive system during operation.

The mounting assembly 62 includes a first arm section 72 that extends from each of the elongated support members 70. In certain embodiments, the first arm section 72 is oriented in a direction that is generally perpendicular to the side wall.

Proximate an end of the first arm section 72 that is opposite the elongated support members 70, the first arm sections 72 are interconnected. In certain embodiments, the interconnection may be done with a tube 74.

In certain embodiments, the arms 76 are pivotally attached to the motor 60. Using such a configuration facilitates movement of the motor 60 as the curtain region 20 is rolled and unrolled.

Figure 6:
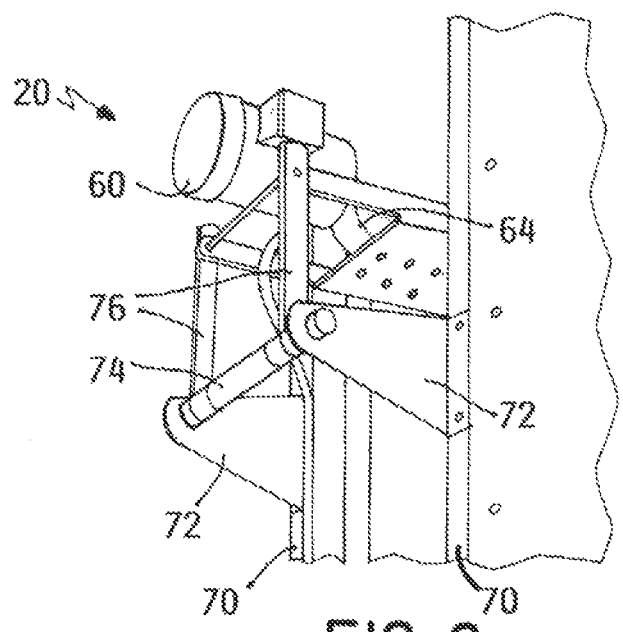
FIG. 6 is an enlarged perspective view of a motor assembly of the curtain system of FIG. 1 where the curtain system is in the open configuration.

Movement of the motor 60 as the curtain region 20 is moved between the open configuration and the closed configuration is illustrated in FIGS. 6-9. When the curtain region 20 is in the open configuration, the motor 60 may be oriented in a direction that is generally perpendicular to the side wall, as illustrated in FIG. 6.

Figure 7:
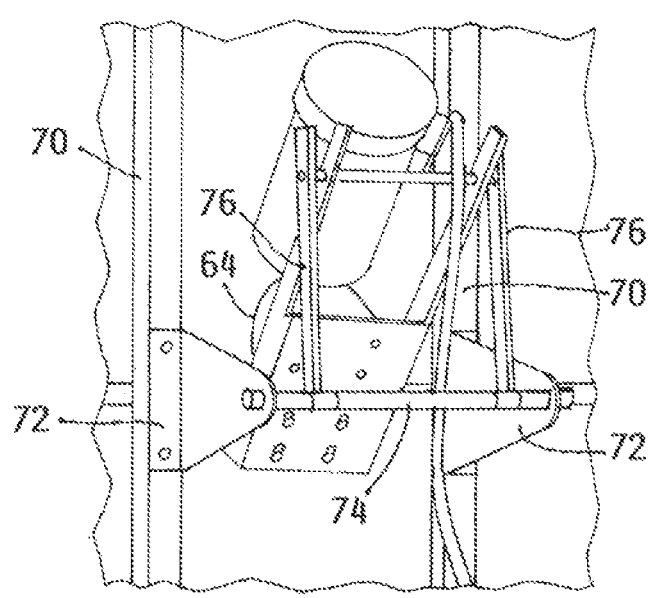
FIG. 7 is an enlarged perspective view of the motor assembly where the curtain system is in a first partially closed configuration.
Figure 8:
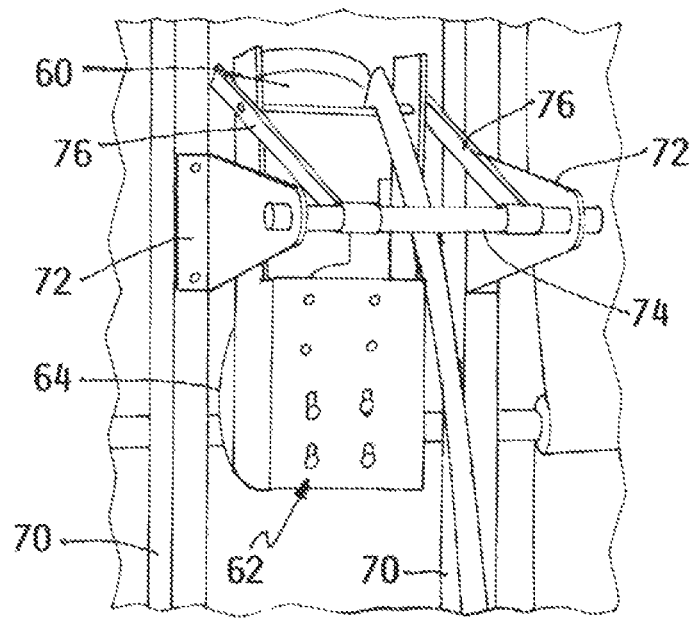
FIG. 8 is an enlarged perspective view of the motor assembly where the curtain system is in a second partially closed configuration.
Figure 9:
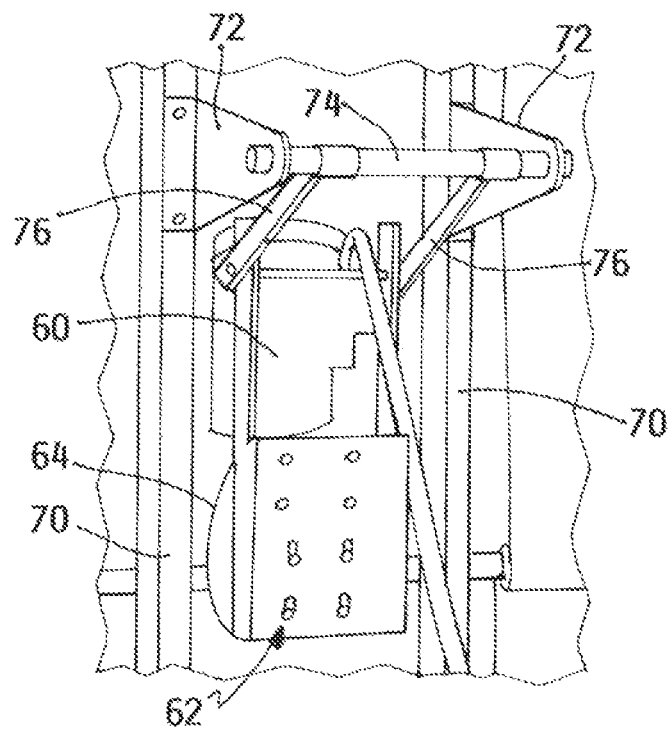
FIG. 9 is an enlarged perspective view of the motor assembly where the curtain system is in the closed configuration.

As the unrolling process continues, the motor 60 pivots with respect to the arms 76, as illustrated in FIG. 7. The arms 76 are then caused to pivot with respect to the tube 74, as illustrated in FIG. 8. This movement continues until the motor 60 is generally parallel to the side wall when the curtain region 20 is in the closed configuration, as illustrated in FIG. 9.

Because of the pivoting of the motor 60 with respect to the arms 76 and the pivoting of the arms with respect to the tube 74, the motor 60 moves in a generally arcuate path during the process of moving the curtain region 20 between the open configuration and the closed configuration.

The configuration of the mounting assembly 62 provides the curtain system 10 with a high degree of operational strength such that the curtain system 10 can operate reliability to buildings 12 have a relatively long length such as greater than about several hundred feet.

In certain situations where it is desired to enhance the ability of the curtain system 10 to resist air flow through the building 12 such as an agricultural building, a panel 52 may be mounted to extend over opposite ends of the curtain region 20, as illustrated in FIG. 4. The panel 52 may be fabricated from a flexible material so that the panel 52 can be positioned in contact with the curtain region 20 but not impede the movement of the curtain region 20 between the open configuration and the closed configuration.

Figure 5:
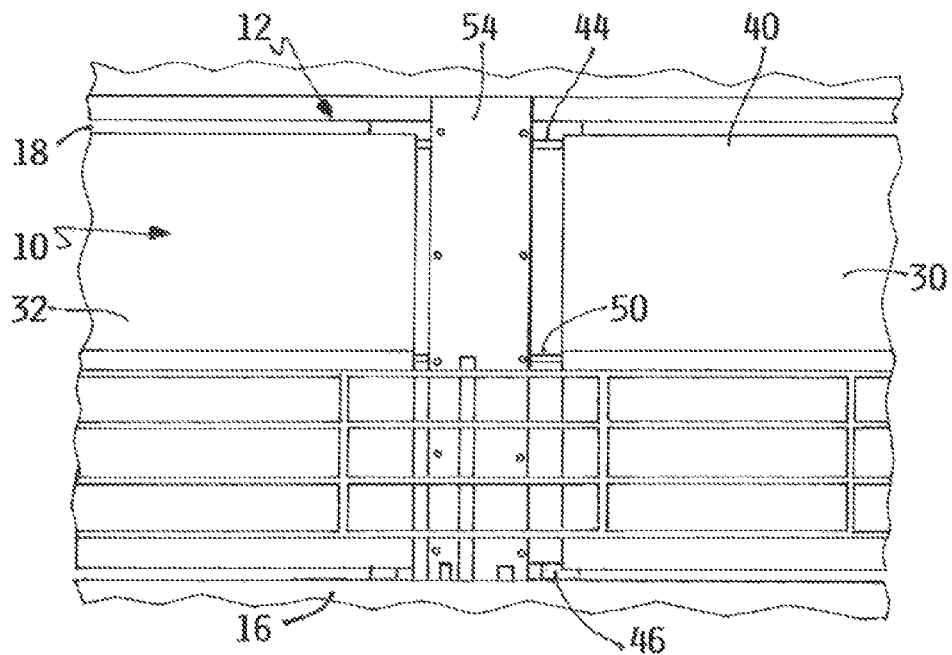
FIG. 5 is an enlarged perspective view of an inner surface of the central region of the curtain system of FIG. 1

A panel 54 may also be mounted over a surface of the motor assembly 22, as illustrated in FIG. 5, to resist air flow through the motor assembly 22. The panel 54 should be mounted to not interfere with the movement of the motor assembly 22 when the curtain region 20 is moved between the open configuration and the closed configuration.

The curtain system 10 may also include at least one anti-flap structure 78 that causes the curtain system 10 to resist movement away from the side wall in response to force placed thereon such as from wind. In certain embodiments, the anti-flap structure 78 includes a vertically oriented tube 80. The vertically oriented tubes 80 may be mounted in a spaced-apart configuration along the side walls. The strength of the vertically oriented tubes 80 and the number of vertically oriented tubes 80 that are used may be selected based upon factors such as the velocity of the wind in the area where the building 12 is located.

An upper bracket 82 and a lower bracket 83 may be used for mounting the vertically oriented tube 80 to the building 12. In this regard, the upper bracket 82 may have a first bracket portion 84 and a second bracket portion 86.

The first bracket portion 84 may have at least one aperture 88 formed therein that is adapted to receive a fastener (not shown) such as a screw for attaching the upper bracket 82 to the building 12.

The upper bracket 82 may also facilitate attachment of the first curtain section 30 to the building 12. In one configuration, the first bracket portion 84 includes a recess 90 formed proximate a lower end thereof that is adapted to receive a portion of the upper tube 44. This configuration enables the first curtain section 30 to be readily attached to and detached from the upper bracket 82. While not illustrated, it is possible to use a fastener to retain the upper tube 44 in the recess 90 such as in areas that are particularly windy.

The second bracket portion 86 may be oriented at an angle with respect to the first bracket portion 84. In certain embodiments, the angle is about 90 degrees. The second bracket portion 86 may have an aperture 92 formed therein that is adapted to receive the upper tube 44.

While it is illustrated that the aperture 92 has a shape that generally corresponds to the shape of the vertically oriented tube 80, it is possible to use other mechanisms for mounting the upper end of the vertically oriented tube 80 to the upper bracket 82.

Similar to the upper bracket 82, the lower bracket 83 may include a first bracket portion 94 and a second bracket portion 96. The first bracket portion 94 may have at least one aperture 98 formed therein that is adapted to receive a fastener (not shown) such as a screw for attaching the lower bracket 83 to the building 12.

The second bracket portion 96 may be oriented at an angle with respect to the first bracket portion 94. In certain embodiments the angle is about 90 degrees. The second bracket portion 96 includes a mechanism 100 for attaching the lower end of the vertically oriented tube 80.

Figure 12:
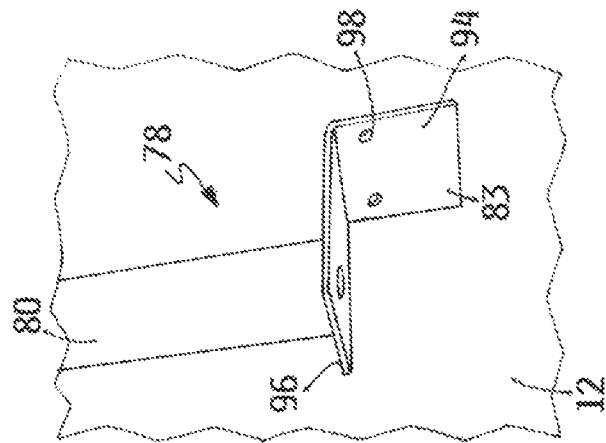
FIG. 12 is a perspective view of the lower bracket in an assembled configuration.
Figure 11:
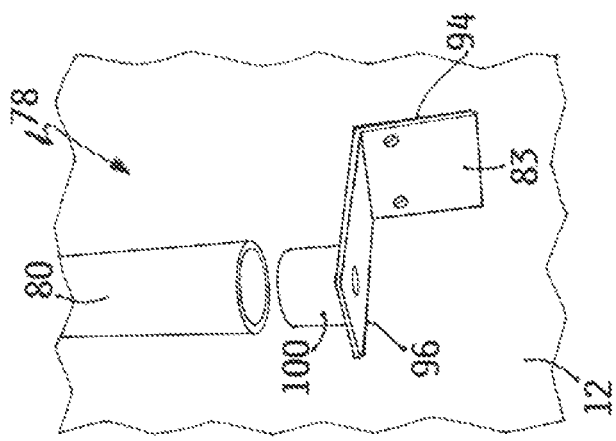
FIG. 11 is a perspective view of a lower bracket for the curtain system in an unassembled configuration.
Figure 10:
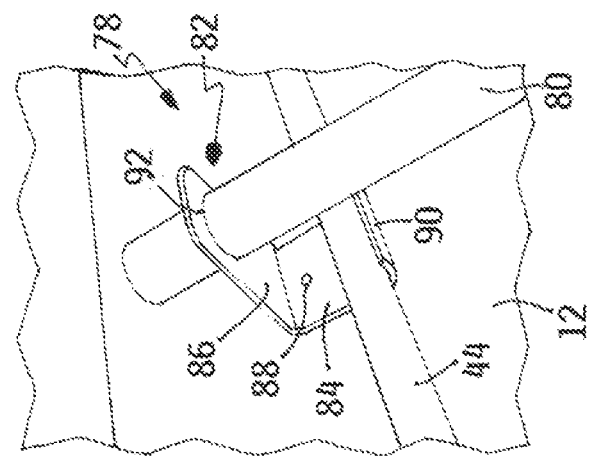
FIG. 10 is a perspective view of an upper bracket for the curtain system.

In certain embodiments, the attachment mechanism 100 has a tubular shape with an outer diameter that is smaller than an inner diameter of the vertically oriented tube 80 so that the attachment mechanism 100 may be inserted into the vertically oriented tube 80. FIGS. 11 and 12 show the vertically oriented tube 80 separated from and inserted into the attachment mechanism 100. This configuration enables the vertically oriented tube 80 to be securely and readily attached to and detached from the lower bracket 83.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A method of operating a retractable curtain system with respect to a building having at least one opening in a side thereof, wherein the method comprises:
    pivotally mounting a motor assembly with respect to a building with a mounting arm assembly, wherein the mounting arm assembly comprises at least one mounting arm, wherein the mounting arm assembly comprises a first arm section and a second arm section that are pivotally mounted to each other, wherein an end of the first arm section opposite the second arm section is attached to the building, wherein an end of the second arm section opposite the first arm section is pivotally attached to the motor assembly, wherein the mounting arm assembly further comprises at least one elongated support member that is attached to the building and wherein the end of the second arm section opposite the first arm section is attached to the at least one elongated support member;
    attaching a first curtain region to the motor assembly;
    positioning the first curtain region in an unrolled configuration where the first curtain region at least partially covers an opening in the building; and
    operating the motor assembly to cause the first curtain region to move from the unrolled configuration to a rolled configuration, wherein the mounting arm assembly allows the motor assembly to pivot with respect to the building as the first curtain region moves from the unrolled configuration to the rolled configuration.

2. The method of claim 1, and further comprising operably attaching the first curtain section to the motor assembly with an intermediate tube.

3. The method of claim 2, wherein the first curtain region comprises a first curtain section and a second curtain section that are attached together proximate the intermediate tube.

4. The method of claim 1, and further comprising operably attaching a second curtain section to the motor assembly opposite the first curtain section, wherein the first curtain system further comprises an upper tube and a lower tube, wherein the upper tube is operably attached to the first curtain region proximate an upper end thereof and wherein the lower tube is operably attached to the first curtain region proximate a lower end thereof.

5. A method of operating a retractable curtain system with respect to a building having at least one opening in a side thereof, wherein the method comprises:
    pivotally mounting a motor assembly with respect to a building with a mounting arm assembly, wherein the mounting arm assembly comprises at least one mounting arm;
    attaching a first curtain region to the motor assembly;
    positioning the first curtain region in an unrolled configuration where the first curtain region at least partially covers an opening in the building;
    operating the motor assembly to cause the first curtain region to move from the unrolled configuration to a rolled configuration, wherein the mounting arm assembly allows the motor assembly to pivot with respect to the building as the first curtain region moves from the unrolled configuration to the rolled configuration,
    restricting movement of the first curtain section away from the building with an anti-flap mechanism that comprises an upper mounting bracket, a lower mounting bracket and an elongated member, wherein the upper mounting bracket and the lower mounting bracket are attached to the building and wherein the elongated member extends between the upper mounting bracket and the lower mounting bracket; and attaching the first curtain section to the building with the upper mounting bracket.

\* \* \* \* \*